UNITED STATES PATENT OFFICE.

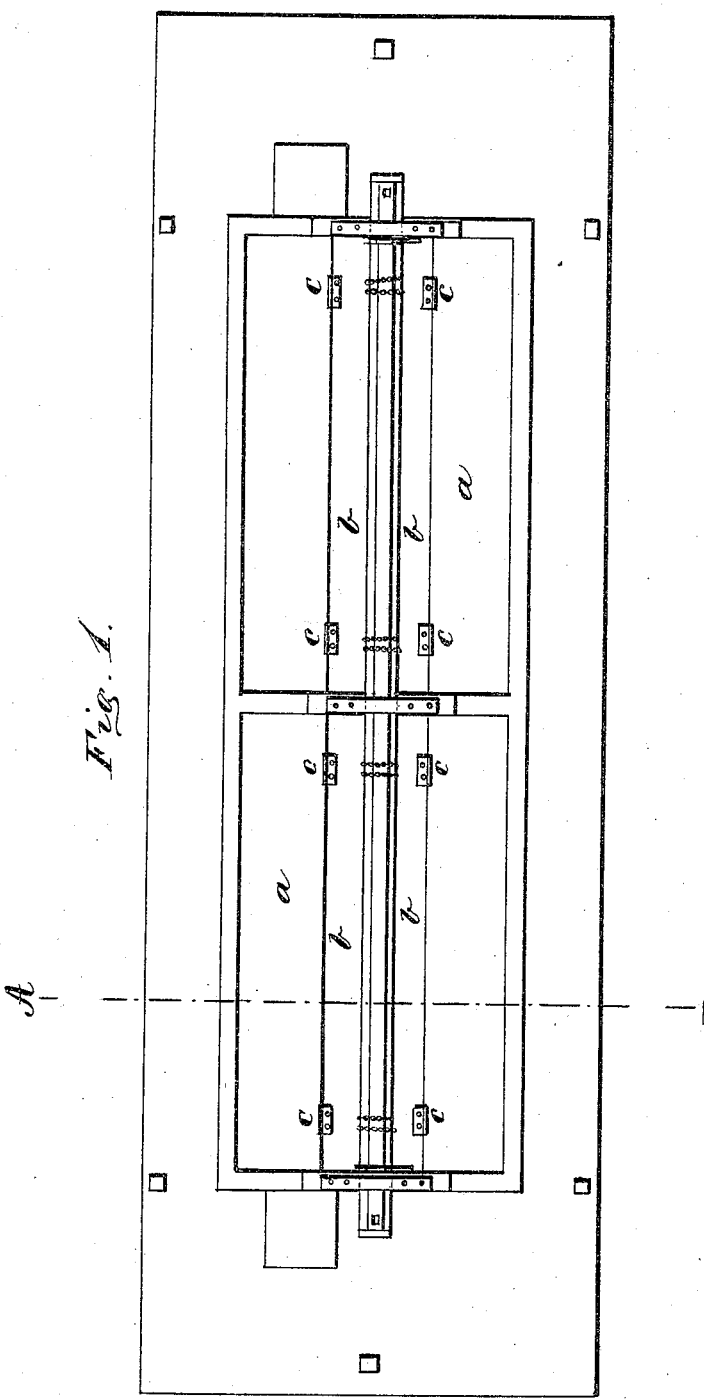

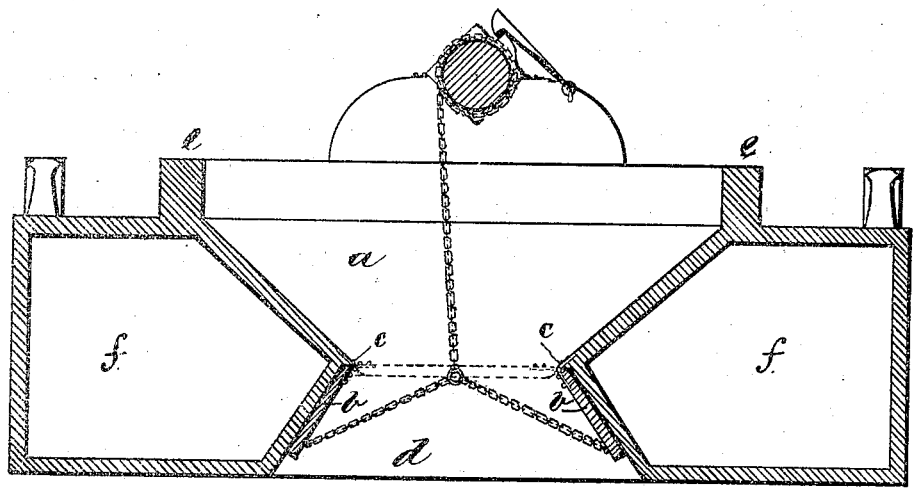

JOSEPH E. BARTLETT, OF BOSTON, MASSACHUSETTS.

IMPROVEMENT IN DUMPING-SCOWS.

Specification forming part of Letters Patent No. 136,578, dated March 11, 1873.

*To all whom it may concern:*

Be it known that I, JOSEPH E. BARTLETT, of Boston, in the county of Suffolk and State of Massachusetts, have invented certain new and useful Improvements in Mud-Scows, of which the following is a specification:

My invention relates to improvements in mud-scows for the transportation and discharge of mud, dirt, &c.; and consists in so constructing a scow that the discharge gates or doors may be at liberty to swing out further than to a perpendicular position when fully open, so as to allow the mud and dirt, &c., to spread out and discharge itself evenly and on less depth of water than could be accomplished with the ordinary scows now in use.

On the drawing, Figure 1 is a ground plan; and Fig. 2 is an enlarged cross-section over the line A B, as shown on Fig. 1.

Similar letters refer to similar parts wherever they occur on the different parts of the drawing.

On the drawing, *a* is the hold or mud-room of my improved mud-scow. To the lower part of said hold is hinged the gates or doors *b b*, by means of suitable hinges *c c*, as shown. I also make the space *d* in which the doors *b b* operate wider at the bottom than at the top where the doors are hinged, so as to allow the gates *b b* to spread outward in their lower edges when opened to their full extent, whereby I obtain the advantage of letting the mud spread outward and discharge itself easily as soon as the gates are opened. *f f*, on Fig. 2, show the air-chambers, by which the scow is made buoyant.

The disadvantage common to scows where the gates were only opened to a vertical position was, that the mud would be deposited as a projecting wall, on which the scow would ground, whereas with my improved scows I am able to discharge the mud so that it spreads out to a level, in consequence of which I can discharge my improved scows on less depth of water than could be done with any other scows now in use. When the ordinary scows are loaded they require more than two feet depth of water in addition to their draft to be discharged without grounding, whereas I can discharge my improved scows on a depth of water equal to their drafts when loaded.

As the scow is discharged it rises gradually above the deposited mud, and I am therefore enabled to float them away without any liability of grounding.

To compensate for the extra space *d* taken from the hold or mud-room *a* I raise the combings *e e* above the deck of the scow, so as to obtain the same capacity as in the ordinary scows of the same dimensions.

From the above it will be understood that, comparing my improved scow with one of the ordinary kind of the same dimensions and capacity, I gain the advantage of being able to discharge mud two feet higher than what could be done with the common scows without grounding. The gates are opened and closed by means of windlass and chains in the ordinary way, as shown in the drawing.

What I wish to secure by Letters Patent and claim is—

A mud-scow with air-chambers *f f* on each side of the mud-room *a*, and having its gate-space *d* made wider at the bottom than at the top, in combination with doors *b b*, not projecting below the bottom of the scow, for the purpose of allowing the mud to spread out and discharge itself to a level as soon as the doors *b b* are opened, as herein set forth.

JOSEPH E. BARTLETT.

Witnesses:
ALBAN ANDRÉN,
JOHN R. HEARD.